(12) United States Patent
Hofstätter et al.

(10) Patent No.: US 11,940,779 B2
(45) Date of Patent: Mar. 26, 2024

(54) METHOD AND SYSTEM FOR PRODUCING A SENSOR

(71) Applicant: SICK AG, Waldkirch (DE)

(72) Inventors: Daniel Hofstätter, Waldkirch (DE); Andreas Esslinger, Waldkirch (DE)

(73) Assignee: SICK AG, Waldkirch (DE)

( * ) Notice: Subject to any disclaimer, the term of this patent is extended or adjusted under 35 U.S.C. 154(b) by 665 days.

(21) Appl. No.: 16/986,585

(22) Filed: Aug. 6, 2020

(65) Prior Publication Data
US 2021/0048804 A1 Feb. 18, 2021

(30) Foreign Application Priority Data
Aug. 13, 2019 (DE) .......................... 102019121799.7

(51) Int. Cl.
*G06F 30/20* (2020.01)
*G05B 19/418* (2006.01)
*G06F 119/18* (2020.01)

(52) U.S. Cl.
CPC ... *G05B 19/41865* (2013.01); *G05B 19/4181* (2013.01); *G05B 19/4183* (2013.01); *G06F 30/20* (2020.01); *G05B 2219/37494* (2013.01); *G06F 2119/18* (2020.01)

(58) Field of Classification Search
CPC .............. G06F 30/20; G05B 19/41865; G05B 19/4183
USPC .......................................................... 703/13
See application file for complete search history.

(56) References Cited

U.S. PATENT DOCUMENTS

| 2012/0323343 A1 | 12/2012 | Grichnik et al. |
| 2017/0286572 A1* | 10/2017 | Hershey .................... B64F 5/60 |
| 2018/0210436 A1 | 7/2018 | Burd et al. |

(Continued)

FOREIGN PATENT DOCUMENTS

| DE | 19639424 A1 | 3/1997 |
| DE | 10245176 A1 | 4/2004 |
| DE | 102004040282 A1 | 3/2006 |

(Continued)

OTHER PUBLICATIONS

Früh, Schaudel, Urbas, Tauchnitz; The digital twin of the plant; Handbuch der Prozessautomatisierung; 6 Edition 2018; Essen, Deutschland.

(Continued)

*Primary Examiner* — Andre Pierre Louis
(74) *Attorney, Agent, or Firm* — Nath, Goldberg & Meyer; Jerald L. Meyer

(57) ABSTRACT

System and method for producing a sensor for a processing machine/plant, wherein a digital twin sensor is provided that is related to the sensor, wherein the digital twin sensor is stored in a database (10), wherein the digital twin sensor forms a data model of the sensor, wherein the data model comprises at least one data building block with data for a sensor housing, for an electronic system, for a control and evaluation unit, for a primary sensor element and/or for mechanical components of the sensor, wherein the digital twin sensor is loaded into a construction program for the processing machine/plant, wherein the digital twin sensor is configured in the construction program, wherein the digital twin sensor is adapted to the processing machine/plant and the adapted digital twin sensor is produced as a real adapted sensor.

6 Claims, 2 Drawing Sheets

(56) References Cited

U.S. PATENT DOCUMENTS

2020/0304375 A1* 9/2020 Chennai .................. G06T 17/05
2020/0330046 A1* 10/2020 Bulut ..................... G16H 40/63

FOREIGN PATENT DOCUMENTS

| DE | 102013111052 A1 | 4/2015 |
| DE | 102017200369 A1 | 7/2018 |
| EP | 1522876 A2 | 4/2005 |
| WO | 2019040125 A1 | 2/2019 |

OTHER PUBLICATIONS

German Search Report dated Jun. 3, 2020 corresponding to application No. 102019121799.7.

Braun, Viktor "Digitilzation in Machine Engineering"; Siemens AG.2016.

"New MTS Sensors Electronic Product Catalog allows you to download intelligent 3D CAD models for sensors"; Jul. 28, 2016; MTS Sensors.

"Online configurations and intelligent CAD models minimize design time for gripping systems"; Nov. 30, 2018: Cadenas.

"Siemens Software: PLM Overview Video for Beginners"; Nov. 8, 2016.

* cited by examiner

METHOD AND SYSTEM FOR PRODUCING A SENSOR

BACKGROUND

Field

The present invention relates to a method for producing a sensor system comprising a sensor element or electronics receiving a sensor input and using a digital twin sensor and to a system implementing the sensor system.

Background

Sensors, such as for example, light barriers and light scanners are used in large numbers today and for this reason are developed and produced as standard devices for a broad field of application.

Nevertheless, sensors in industrial plants have many different tasks. Depending on the field of industry, the requirements of these tasks for the sensors are very specific. It is thus necessary to adapt the sensors to these specific requirements.

Today setting possibilities are made accessible to the user for the above mentioned adaptations. For example, a setting of a working point or a setting of whether the sensor is light switching or dark switching. As a rule, this takes place via buttons or rotary knobs.

A different possibility is to parameterize the sensors via bus systems, for example, IO link and a corresponding software. In this way adaptations in the sensor software and the sensor firmware can be carried out or, for example, ASIC parameter can be changed, for example an adaptation of a switching hysteresis.

Besides the sensor parameterization frequently a cable length has to be customized in order to be able to integrate the sensors into a plant in an as space saving as possible manner.

Generally speaking the parameterization of the sensors takes place in the plant at every individual device by a technician. On a parameterization via bus systems, such as TO link, a computer is required for the parameterization. This is very demanding in time for a large number of utilized sensors.

In this connection if cable lengths have to be shortened then this represents a waste of resources. The cable pieces by means of which the sensor cables have to be shortened are discarded and are never used for their intended purpose.

In order to be able to serve operate as many as possible uses and/or applications with standard sensors, sensor manufacturers frequently deliver the sensors with very long cables. This increases the above mentioned problem. The alternative is to have different cable lengths available as standard sensors; however, this leads to high costs of storage.

An object of the invention exists therein to improve a production of the sensor. In particular a parameterization and/or an assembly of the sensor should take place on planning of the plant.

SUMMARY

This object is satisfied by a method for producing a sensor for a processing machine/plant, wherein a digital twin sensor is provided that is related to the sensor, wherein the digital twin sensor is stored in a database, wherein the digital twin sensor forms a data model of the sensor, wherein the data model comprises at least one data building block with data for a sensor housing, for an electronic system, for a control and evaluation unit, for a primary sensor element and/or for mechanical components of the sensor, wherein the digital twin sensor is loaded into a construction program for the processing machine/plant, wherein the digital twin sensor is configured in the construction program, wherein the digital twin sensor is adapted to the processing machine/plant and the adapted digital twin sensor is produced as a real adapted sensor.

The object is further satisfied by a system for producing a sensor for a processing machine/plant, wherein a digital twin sensor is provided that is related to the sensor, wherein the digital twin sensor is stored in a database, wherein the digital twin sensor forms a data model of the sensor, wherein the data model comprises at least one data building block with data for a sensor housing, for an electronic system, for a control and evaluation unit, for a primary sensor element and/or for mechanical components of the sensor, wherein the digital twin sensor can be loaded into a construction program for the processing machine/plant, wherein the digital twin sensor can be configured in the construction program, wherein the digital twin sensor is adapted to the processing machine/plant and the adapted digital twin sensor is produced as a real adapted sensor.

The sensors to be produced are made available to a plant designer in the form of the digital twin sensor in the construction program. The construction program is a domain specific software, such as for example, SolidWorks, Siemens NX Designer or similar software.

The digital twin sensor enables all setting possibilities of the sensor. Thereby the settings can be carried out already virtually on the plant design.

In accordance with the invention configuration parameters and certain hardware parameters can, for example be automatically detected in the construction program and converted into a production parameter in the digital twin.

For example, a distance along the optical axis of a digital twin sensor to an object to be detected is recorded in the construction program and converted in a digital twin into a teaching value and/or a learning value. If the distance is, for example, too large for the used digital twin sensor, a message appears which recommends the use of a different sensor and, for example offers a selection of the associated digital twin sensor.

Furthermore, for example, a required cable length can be automatically determined in the construction program, as soon as the sensor is positioned and the position for the sensor connections is known. The required cable length of the connection cables is noted in the digital twin.

Having regard to the construction program this can also be a program in which the digital twin sensor is adaptable, wherein the construction program has an export function in order to make the adapted digital twin sensor available to a different construction program.

In accordance with the invention a fast installation of the sensors in the plant is possible. The sensors are immediately ready to work following the installation and already individually set up. In exceptional cases the sensors by way of example still require a fine adjustment. For example, a fine adjustment of the switching point takes place, as the coarse switching point was already set on the production of the sensor. If, for example, the digital twin sensor is updated with the fine adjustment from the processing machine/plant, then a parameterization is no longer required in some circumstances on a sensor exchange.

In accordance with the invention an avoidance of waste and a conservation of resources takes place. For example, if cable lengths are made to measure, then the waste of cables does not apply that would have to be shortened on assembly.

In an embodiment of the invention the data model comprises construction data, functional data and/or design data of the digital twin sensor. The construction data at least include the used components and/or component groups, their dimensions and their materials. The functional data at least include the function of the used components and/or component groups, as well as data sheet values for the specification of the component and/or the component group. Design data, for example, include design rules for the sensor assembly, such as, for example, optical rules.

In an embodiment of the invention the data model comprises at least production specific pieces of information of the digital twin sensor, namely comparison values and/or alignment values. The comparison values and/or alignment values form a final setting of the sensor for the specific sensor or, for example, a specific purpose of use. In this way, for example, a sensitivity of the sensor can be set or, for example, optical axes of the sensor can be aligned.

In an embodiment of the invention the data are configuration data, parameterization data and/or key figures of the digital twin sensor. Parameterization data or configuration data are, for example, a set range, a number of protective fields, a detection field etc. of the sensor.

In an embodiment of the invention the sensor and the digital twin sensor are connected one to another via an interface, wherein data can be transmitted at least from the sensor to the digital twin sensor via the interface.

Deviations between the digital twin sensor and the real sensor can be determined in the real sensor or in the digital twin sensor thereby that a comparison between the real sensor and the digital twin sensor is carried out via the interface.

The interface can, for example be an ethernet interface and/or an ethernet connection. However, also other kinds of interfaces are possible. For example, the interface can be a bus system. Optionally the interface is configured as a secure interface, in particular an interface secure from errors. It can in particular also be a secure bus system. The interface can be a radio interface. The interface can be a remote interface, since the sensor and the digital twin sensor are spatially separated from one another. In this way the database with the digital twin sensor is stored in a data processing center remote from the sensor.

In an embodiment of the invention the sensor and the digital twin sensor each have an unambiguous identification number which are linked with one another in order to unambiguously link the digital twin sensor to the sensor and/or the sensor to the digital twin sensor.

Following an adaptation of the digital twin sensor in the construction program and/or in the plant design software, each digital twin sensor obtains an unambiguous identification number in the processing machine/plant of the user and/or of the customer and an unambiguous identification number in the sensor production. With this unambiguous identification number, the digital twin sensor is sent to the sensor production as a production order.

During the sensor production the sensor is produced with the corresponding cable lengths and parameterizations like for the digital twin sensor. The newly produced sensor includes the same identification number like its digital twin. In this way one can ensure that the sensor has the same properties as its digital twin sensor. Furthermore, it is ensured that the sensor is mounted at the same position and in the same orientation in the plant as its digital twin sensor.

A copy of the digital twin sensor associated with the processing machine/plant is stored in an administration system. Thus, a new real sensor can be produced in the replacement parts business. By means of its unambiguous identification number it can always be identified.

This copy of the digital twin sensor can be updated by the customer if required, when a post alignment of the parameterization takes place on taking into operation.

In an embodiment of the invention the data of the sensor are continuously transmitted or transmitted at fixed intervals to the digital twin sensor during an operating phase of the sensor.

Following a new installation of the sensor, the data can, for example, be continuously transmitted between the sensor and the digital twin sensor, as the sensor is subjected to environmental conditions for the first time at this point in time and an influencing of the sensor takes place with a high probability. In this way the digital twin sensor is adapted to the real sensor.

In the course of operation and depending on the sensor and/or the place of use, a transfer can take place at fixed intervals with different spacings of, e.g. seconds, minutes, hours, days, weeks, months or years.

The more dramatic and/or frequent the changes of environmental conditions is, the more frequent a cyclic transfer of data can take place.

The sensors can be light barriers, light scanners, light curtains, light grids, cameras, 3D cameras, barcode readers, laser scanners, inductive sensors, magnetic sensors, capacitive sensors or the like.

BRIEF DESCRIPTION OF THE DRAWINGS

The invention will be described in the following also with regard to further advantages and features with reference to the submitted drawings by means of embodiments. The Figures in the drawing show.

DETAILED DESCRIPTION

Figure 1:
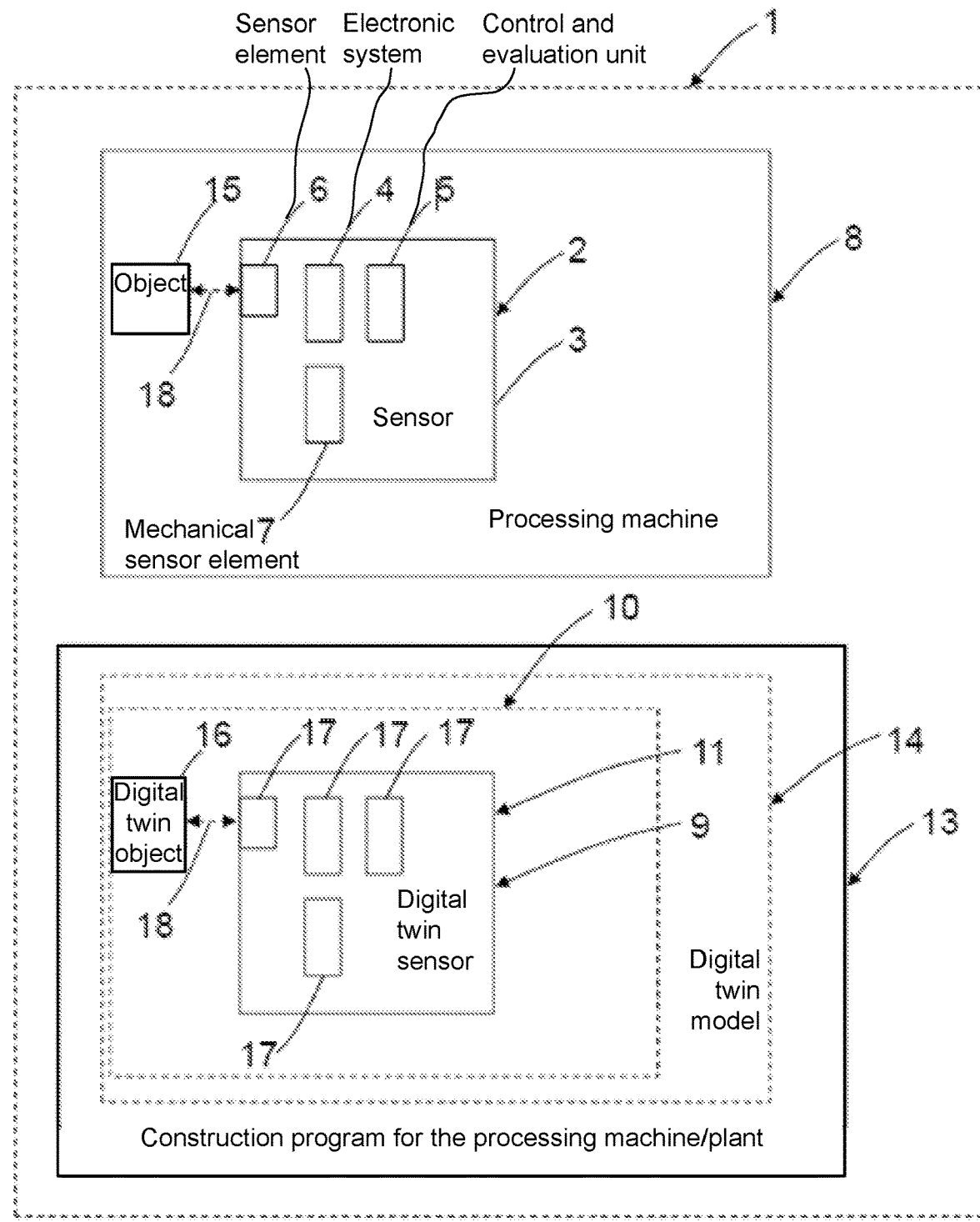
FIG. 1 and FIG. 2
a respective system and method in accordance with the invention for producing a sensor.

In the following Figures identical parts are provided with identical reference numerals.

FIG. 1 shows a system 1 and/or a method for producing a sensor 2 for a processing machine/plant 8, wherein a digital twin sensor 9 is provided that is related to the sensor 2, wherein the digital twin sensor 9 is stored in a database 10, wherein the digital twin sensor 9 forms a data model 11 of the sensor 2, wherein the data model 11 comprises at least one data building block 17 with data for a sensor housing 3, for an electronic system 4, for a control and evaluation unit 5, for a primary sensor element 6 and/or for mechanical components 7 of the sensor 2, wherein the digital twin sensor 9 can be loaded into a construction program 13 for the processing machine/plant 8, wherein the digital twin sensor 9 can be configured in the construction program 13, wherein the digital twin sensor 9 is adapted to the processing machine/plant 8 and the adapted digital twin sensor 9 is produced to provide adaptations to sensor 2, as a real adapted sensor.

The sensors 2 to be produced are made available to a plant designer in the form of the digital twin sensor 9 in the construction program 13. The construction program 13 is a domain specific software, such as, for example, SolidWorks, Siemens NX Designer or similar software. A digital model 14 of the processing machine/plant is present in the construction program 13. Furthermore, also a digital model 16 of objects 15 is present.

The digital twin sensor 9 enables all setting possibilities of the sensor 2.

In accordance with FIG. 1 configuration parameters and certain hardware parameters can, for example, be automatically detected in the construction program 13 and converted into a production parameter in the digital twin sensor 9.

By way of example, a distance 18 along the optical axis of a digital twin sensor 9 to a digital model 16 of an object 15 to be detected is detected in the construction program 13 and is converted to a teaching value and/or a learning value in the digital twin sensor 9. For example, if the distance 18 is too large for the used digital twin sensor 9, then a notification appears which recommends the use of a different sensor and, for example, offers a selection of the associated digital twin sensor 9.

Furthermore, for example, a required cable length can be automatically determined in the construction program 13, as soon as the digital twin sensor 9 is positioned and the position for the sensor connections is known. The required cable length of the connection cable is noted in the digital twin sensor 9.

The construction program 13 can also be a program in which the digital twin sensor 9 can be adapted, wherein the construction program 13 has an export function in order to make available the adapted digital twin sensor 9 to a different construction program 13.

In accordance with FIG. 1 the data model 11 has construction data, functional data and/or design data of the digital twin sensor 9.

In accordance with FIG. 1 the data model 11 includes at least production specific pieces of information of the digital twin sensor 9, namely comparison values and/or alignment values. By way of example, a sensitivity of the digital twin sensor 9 and/or of the sensor 2 can thus be set or, for example, optical axes of the digital twin sensor 9 and/or of the sensor 2 can be adjusted.

In accordance with FIG. 1, the data are configuration data, parameterization data and/or key figures of the digital twin sensor 9. Parameterization data or configuration data are, for example, a set range, a number of protective fields, a detection field etc. of the sensor 2 and/or of the digital twin sensor 9.

Figure 2:
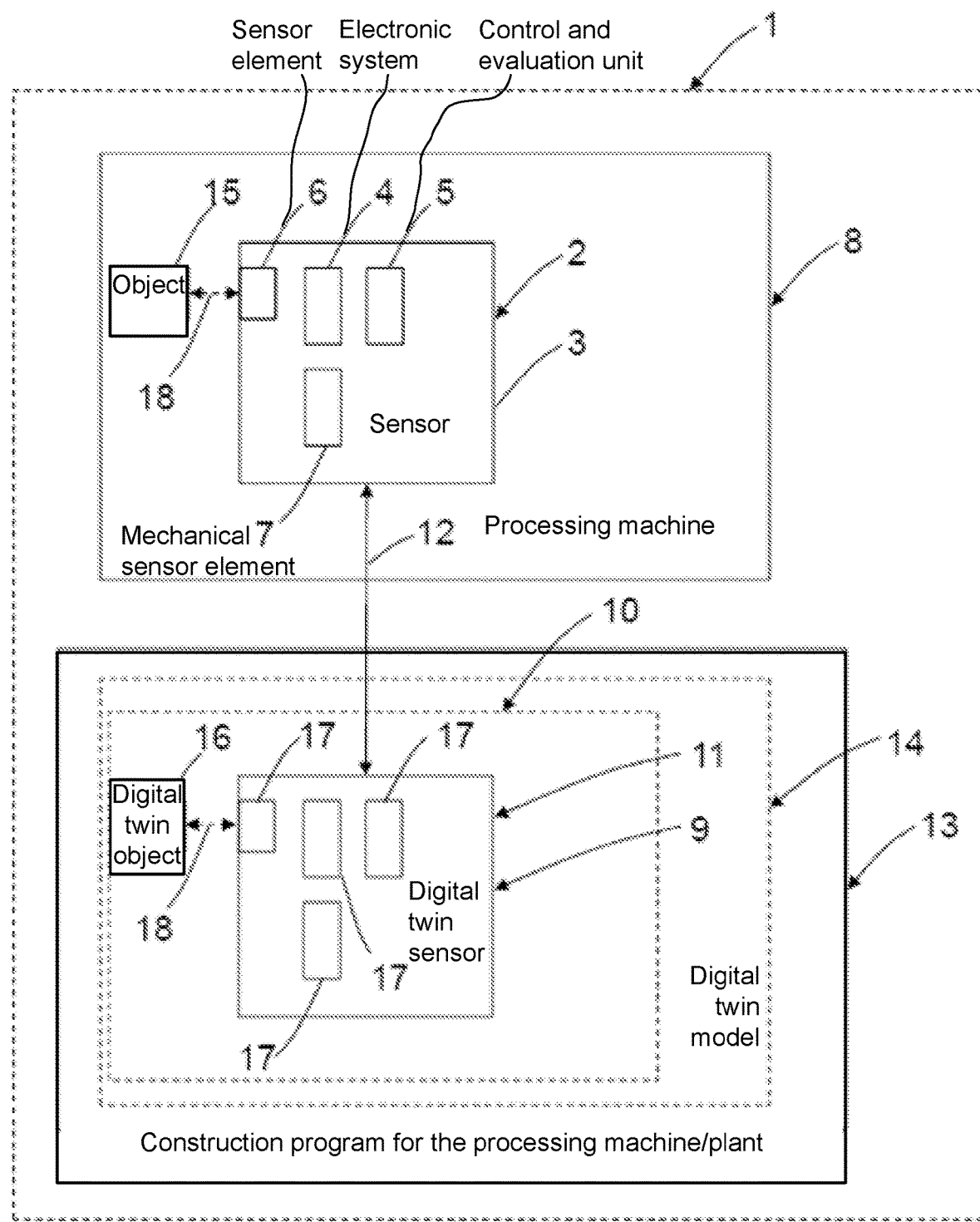

In accordance with FIG. 2, the sensor 2 and the digital twin sensor 9 are connected one to another via an interface 12, wherein data can be transmitted at least from the sensor 2 to the digital twin sensor 9.

Deviations between the digital twin sensor 9 and the real sensor 2 can be determined in the real sensor 2 or in the digital twin sensor 9 thereby that a comparison between the real sensor 2 and the digital twin sensor 9 is carried out via the interface 12.

In accordance with a non-illustrated embodiment the sensor and the digital twin sensor each have an unambiguous identification number which are linked with one another in order to unambiguously associate the digital twin sensor with the sensor and/or the sensor with the digital twin sensor.

Following the adaptation of the digital twin sensor in the construction program and/or in the plant design software each digital twin sensor receives an unambiguous identification number in the processing machine/plant of the user and/or customer and an unambiguous identification number in the sensor production. With this unambiguous identification number, the digital twin sensor is sent to the sensor production as a production order.

In the sensor production the sensor is produced with the corresponding cable lengths and parameterizations, as for the digital twin. The newly produced sensor includes the identical identification number as its digital twin.

In accordance with FIG. 2 the data of the sensor 2 are continuously transmitted or transmitted at fixed intervals to the digital twin sensor 9 during an operating phase of the sensor 2.

Following a new installation of the sensor 2, the data can, for example, be continuously transmitted between the sensor 2 and the digital twin sensor 9, as the sensor 2 is subjected to environmental conditions for the first time at this point in time and an influencing of the sensor 2 takes place with a high probability. In this way the digital twin sensor 9 is adapted to the real sensor 2.

The sensors 2 in accordance with FIGS. 1 to 2 can be light barriers, light scanners, light curtains, light grids, cameras, 3D cameras, barcode readers, laser scanners, inductive sensors, magnetic sensors, capacitive sensors or the like.

REFERENCE NUMERALS 1 system
2 sensor
3 sensor housing
4 electronic system
5 control and evaluation unit
6 primary sensor element
7 mechanical components
8 processing machine/plant
9 digital twin sensor
10 database
11 data model
12 interface
13 construction program
14 digital model of the processing machine/plant
15 object
16 digital model of the object
17 data building blocks
18 distance

The invention claimed is:

1. Method of producing a sensor for a processing machine/plant, comprising:
providing a sensor comprising a sensor element or electronics receiving a sensor input;
providing a digital twin sensor that is related to the sensor and stored in a database;
using the digital twin sensor to form a data model of the sensor,
wherein the data model comprises at least one data building block with data for a sensor housing, for an electronic system, for at least one of a control and evaluation unit, for a primary sensor element and mechanical components of the sensor,
loading the digital twin sensor into a construction program for the processing machine/plant,
wherein the digital twin sensor is configured in the construction program provided for the processing machine/plant as domain specific software,
wherein the digital twin sensor is adapted to the processing machine/plant, and the adapted digital twin sensor is produced as a real adapted sensor,
wherein the sensor and the digital twin sensor are connected to one another via an interface, wherein data can be transferred at least from the sensor to the digital twin sensor via the interface, and wherein the sensor and the digital twin sensor each have an unambiguous identification number which are linked to one another in order to unambiguously associate the digital twin sensor with at least one of the sensor and the sensor with the digital twin sensor; and during an operating phase of the sensor, continuously transmitting the data of the sensor or transmitted or transmitting the data at fixed intervals to the digital twin sensor.

2. The method in accordance with claim 1, wherein the data model comprises at least one of construction data, functional data and design data of the digital twin sensor.

3. The method in accordance with claim 1, wherein the data model includes at least production specific pieces of information of the digital twin sensor.

4. The method in accordance with claim 3, wherein the production specific pieces of information comprise at least one of comparison values and alignment values.

5. The method in accordance with claim 1, wherein data of the data model are at least one of parameterization data and key figures of the digital twin sensor.

6. System for producing a sensor output for a processing machine/plant, comprising:
a sensor comprising a sensor element or electronics receiving a sensor input; and
a digital twin sensor is provided that is related to the sensor, wherein the digital twin sensor is stored in a database,
wherein the digital twin sensor is provided that is related to the sensor,
wherein the digital twin sensor forms a data model of the sensor,
wherein the data model comprises at least one data building block with data for a sensor housing, for an electronic system, for at least one of a control and evaluation unit, for a primary sensor element and mechanical components of the sensor,
wherein the digital twin sensor can be loaded into a construction program for the processing machine/plant,
wherein the digital twin sensor can be configured in the construction program provided for the processing machine/plant as domain specific software,
wherein the digital twin sensor is adapted to the processing machine/plant and the adapted digital twin sensor is produced as a real adapted sensor,
wherein the sensor and the digital twin sensor are connected to one another via an interface,
wherein data can be transferred at least from the sensor to the digital twin sensor via the interface,
wherein the sensor and the digital twin sensor each have an unambiguous identification number which are linked to one another in order to unambiguously associate the digital twin sensor with at least one of the sensor and the sensor with the digital twin sensor,
and wherein, during an operating phase of the sensor, the data of the sensor is continuously transmitted or transmitted at fixed intervals to the digital twin sensor.

* * * * *

UNITED STATES PATENT AND TRADEMARK OFFICE
CERTIFICATE OF CORRECTION

| | |
|---|---|
| PATENT NO. | : 11,940,779 B2 |
| APPLICATION NO. | : 16/986585 |
| DATED | : March 26, 2024 |
| INVENTOR(S) | : Daniel Hofstätter and Andreas Esslinger |

It is certified that error appears in the above-identified patent and that said Letters Patent is hereby corrected as shown below:

In the Claims

Claim 1, Column 7, Line 10, please delete the phrase "or transmitted".

Signed and Sealed this
Fourteenth Day of May, 2024

Katherine Kelly Vidal
*Director of the United States Patent and Trademark Office*